US007661008B2

(12) United States Patent
Retter et al.

(10) Patent No.: US 7,661,008 B2
(45) Date of Patent: Feb. 9, 2010

(54) REAL TIME CLOCK CIRCUIT HAVING AN INTERNAL CLOCK GENERATOR

(75) Inventors: Eric E. Retter, Austin, TX (US); John M. Sutton, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 11/196,111

(22) Filed: Aug. 3, 2005

(65) Prior Publication Data

US 2005/0265127 A1 Dec. 1, 2005

(51) Int. Cl.
*G06F 1/00* (2006.01)

(52) U.S. Cl. ......................... 713/500; 713/501; 368/47; 375/354; 375/355

(58) Field of Classification Search ................. 713/500, 713/501; 368/47; 375/354, 355
See application file for complete search history.

(56) References Cited

U.S. PATENT DOCUMENTS

| | | | | | |
|---|---|---|---|---|---|
| 3,728,485 | A | | 4/1973 | Osborne et al. | |
| 3,844,105 | A | * | 10/1974 | Kashio | 368/82 |
| 4,010,603 | A | * | 3/1977 | Forsyth | 368/69 |
| 4,092,819 | A | * | 6/1978 | Takase | 368/85 |
| 4,205,516 | A | * | 6/1980 | Terao | 368/29 |
| 4,282,594 | A | * | 8/1981 | Ichikawa | 368/82 |
| 4,290,131 | A | * | 9/1981 | Kume et al. | 368/71 |
| 4,531,841 | A | * | 7/1985 | Puff | 368/63 |
| 5,083,123 | A | | 1/1992 | Ganter et al. | |
| 5,319,374 | A | | 6/1994 | Desai et al. | |
| 5,521,887 | A | | 5/1996 | Loomis | |
| 5,684,418 | A | * | 11/1997 | Yanagiuchi | 327/99 |
| 5,864,315 | A | | 1/1999 | Welles, II et al. | |
| 5,898,645 | A | | 4/1999 | Sugiyama | |
| 5,925,133 | A | * | 7/1999 | Buxton et al. | 713/323 |
| 5,940,027 | A | | 8/1999 | Forseth et al. | |
| 5,945,944 | A | | 8/1999 | Krasner | |
| 6,069,850 | A | * | 5/2000 | Capps et al. | 368/156 |
| 6,150,980 | A | | 11/2000 | Krasner | |
| 6,246,363 | B1 | | 6/2001 | Yung et al. | |
| 6,266,584 | B1 | | 7/2001 | Hur-Diaz et al. | |
| 6,381,701 | B1 | | 4/2002 | Takai | |

(Continued)

FOREIGN PATENT DOCUMENTS

| | | |
|---|---|---|
| JP | 11311686 | 4/2002 |

*Primary Examiner*—Thomas Lee
*Assistant Examiner*—Vincent T Tran
(74) *Attorney, Agent, or Firm*—Ian D. MacKinnon; Hoffman Warnick LLC

(57) ABSTRACT

Under the present invention a real time clock circuit, within a set-top box, is provided with an internal clock generator for generating multiple clock signals. Once generated, a first clock signal is divided into an initial set of values representing time and optionally day/date intervals, and then communicated to a set of clock registers. The initial set of values can then be communicated (directly or via a set of DCR registers) to a display component within the set-top box. Updated clock signals are received by the set of DCR registers from an external source such as a satellite or the like thus making the clock very accurate, and are communicated to the display component. Similar to the initial set of values, the updated set of values could be communicated to the display component directly from the set of DCR registers, or via the set of clock registers.

14 Claims, 3 Drawing Sheets

U.S. PATENT DOCUMENTS

| | | | | |
|---|---|---|---|---|
| 6,397,147 | B1 | 5/2002 | Whitehead | |
| 6,433,734 | B1 * | 8/2002 | Krasner | 342/357.09 |
| 6,460,125 | B2 * | 10/2002 | Lee et al. | 711/167 |
| 6,473,030 | B1 | 10/2002 | McBurney et al. | |
| 6,480,787 | B2 | 11/2002 | Yoshikawa et al. | |
| 6,549,593 | B1 * | 4/2003 | Rumreich et al. | 375/354 |
| 6,563,765 | B1 * | 5/2003 | Ishigaki | 368/47 |
| 6,564,329 | B1 * | 5/2003 | Cheung et al. | 713/322 |
| 7,102,692 | B1 * | 9/2006 | Carlsgaard et al. | 348/572 |
| 7,292,109 | B2 * | 11/2007 | Haiut | 331/44 |
| 2003/0098729 | A1 * | 5/2003 | Fang | 327/156 |
| 2003/0196126 | A1 * | 10/2003 | Fung | 713/300 |

* cited by examiner

Prior Art

REAL TIME CLOCK CIRCUIT HAVING AN INTERNAL CLOCK GENERATOR

CROSS-REFERENCE TO RELATED APPLICATIONS

This application is related in some aspects to commonly assigned U.S. application Ser. No. 10/437,123, filed May 13, 2003 now U.S. Pat. No. 6,958,953 and entitled Real Time Clock Circuit Having an Internal Clock Generator, which is hereby incorporated by reference.

BACKGROUND OF THE INVENTION

1. Field of the Invention

The present invention generally relates to a real time clock circuit having an internal clock generator. Specifically, the present invention relates to a set-top box having a single clock generator, which is internal to the real time clock circuit and is capable of generating multiple frequencies.

2. Related Art

Set-top boxes are becoming increasingly popular in many households. Specifically, set-top boxes are commonly used to receive cable and/or satellite television signals. As their popularity continues to grow, the functionality provided by the set-top boxes improves. For example, many of today's set-top boxes not only display date and time information, but also provide users with viewing schedules, pay per view options, etc. at the press of a button.

Unfortunately, the functionality provided by a set-top box must be balanced against its cost. Specifically, as the functional capabilities of a set-top box become more advanced, the quantity and cost of the components that must be incorporated increases. For example, many of today's set-top boxes are constructed using two (or more) clock oscillators. One clock oscillator generates a clock signal having a first speed (e.g., 27 MHz), while the second clock oscillator generates a clock signal having a second speed (e.g., 54 MHz). The clock oscillators each drive certain components within the set-top box. For example, in a typical set-top box one clock oscillator (externally) drives a real time clock (RTC) circuit, while another clock oscillator drives a device control register (DCR). Since each clock oscillator could cost several dollars, the inclusion of multiple clock oscillators can greatly effect the total cost of the set-top box.

Still yet, other existing real time clock macros make use of a precision oscillator input to accurately keep the correct time. Precision oscillators are generally used in devices such as personal computers where the information is set once and expected to remain accurate for many months or days. To this extent, precision oscillators are expensive and would considerably add to the cost of a set-top box.

In view of the foregoing, there exists a need to provide a set-top box that includes a single clock oscillator. To this extent, a need exists for a real time clock circuit within a set-top box to include the single clock generator as an internal component. A further need exists for the internal clock generator to receive a clock signal from an external clock oscillator and generate multiple signals therefrom. Still yet, a need exists for updates to the clock signal generated by the internal clock oscillator to be received from an external source such as a satellite or the like.

SUMMARY OF THE INVENTION

In general, the present invention provides a set-top box that has a single clock generator that can generate multiple frequencies. Specifically, the present invention provides a real time clock circuit that includes an internal clock generator for receiving a signal from an external clock oscillator and generating a clock signal. Once generated, the clock signal is divided into an initial set of values representing time and (optionally) day/date intervals. This initial set of values is communicated to a set of clock registers, and then communicated (directly or via a set of DCR registers) from the set of clock registers to a display component within the set-top box. An updated set of values can be received through the set of DCR registers (to improve clock accuracy) from an external source such as a satellite or the like, and communicated to the display component. Similar to the initial set of values, the updated set of values could be communicated to the display component directly from the set of DCR registers, or via the set of clock registers.

According to a first aspect of the present invention, a real time clock is provided. The real time clock comprises an internal clock generator for generating a clock signal, wherein the clock signal is divided by a divider into an initial set of values, and wherein the initial set of values is communicated to a set of clock registers.

According to a second aspect of the present invention, a set-top box is provided. The set-top box comprises: a real time clock circuit having an internal clock generator for generating a clock signal; a divider for dividing the clock signal into an initial set of values; a set of clock registers for receiving the initial set of values from the divider; and a display component for receiving the initial set of values from the set of clock registers.

According to a third aspect of the present invention, a method for communicating a clock signal to a display component within a set-top box. The method comprises: providing a real time clock circuit having an internal clock generator; generating a clock signal with the internal clock oscillator; dividing the clock signal into an initial set of values; communicating the initial set of values to a set of clock registers; and communicating the initial set of values from the set of clock registers to the display component.

Therefore, the present invention provides real time clock circuit having an internal clock generator within a set-top box.

BRIEF DESCRIPTION OF THE DRAWINGS

These and other features of this invention will be more readily understood from the following detailed description of the various aspects of the invention taken in conjunction with the accompanying drawings in which.

Figure 1:
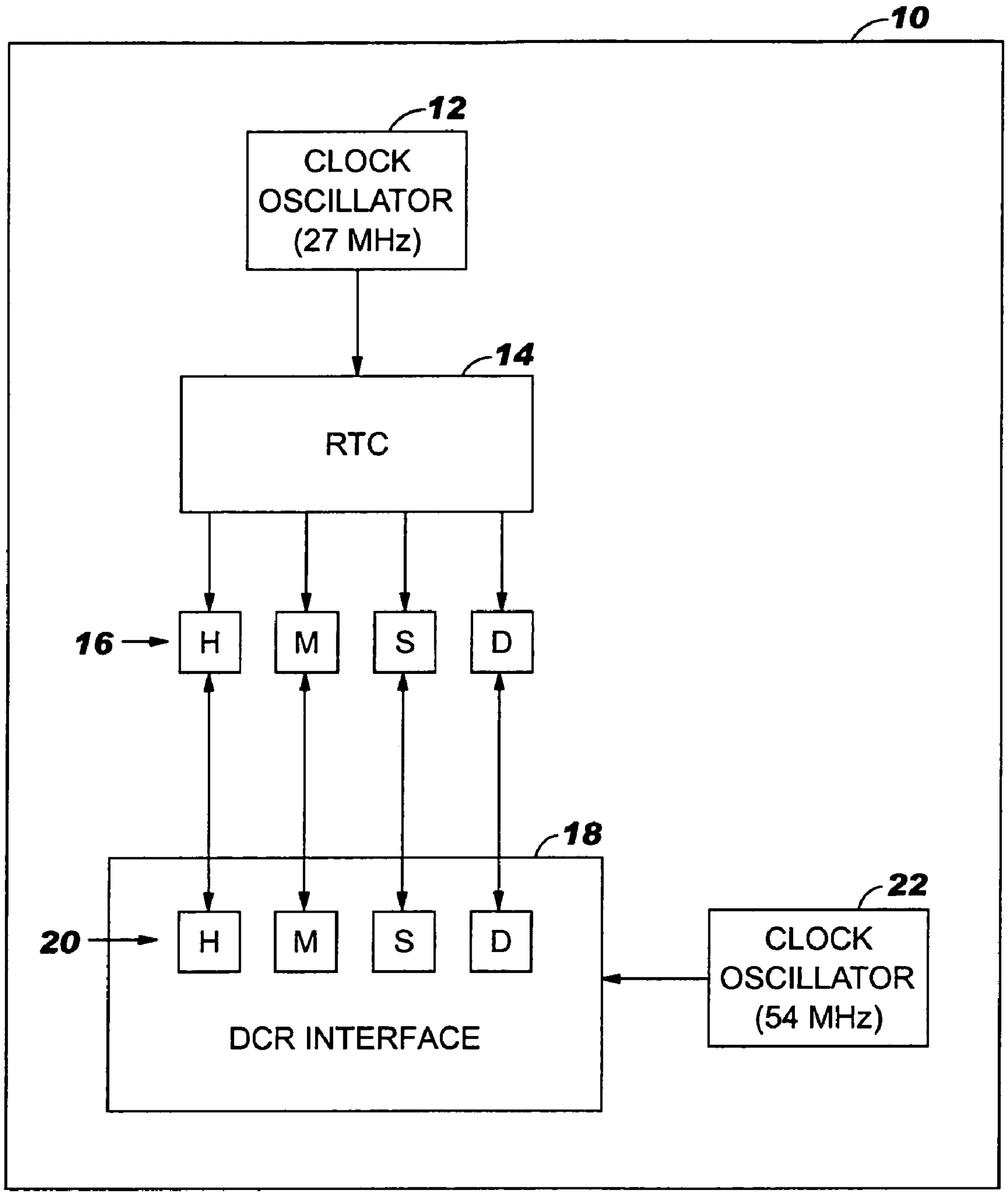
FIG. 1 depicts a related art set-top box design.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a set-top box that has a single clock generator that can generate multiple frequencies. Specifically, the present invention provides a real time clock circuit that includes an internal clock generator for receiving a signal from an external clock oscillator and generating a clock signal. Once generated, the clock signal is divided into an initial set of values representing time and (optionally) day/date intervals. This initial set of values is communicated to a set of clock registers, and then communicated (directly or via a set of DCR registers) from the set of clock registers to a display component within the set-top box. An updated set of values can be received through the set of DCR registers (to improve clock accuracy) from an external source such as a satellite or the like, and communicated to the display component. Similar to the initial set of values, the updated set of values could be communicated to the display component directly from the set of DCR registers, or via the set of clock registers.

Referring now to FIG. 1, a related art set-top box (STB) 10 is shown. As depicted, STB 10 includes a first clock oscillator 12, real time clock (RTC) circuit 14, a set of clock registers 16, device control register (DCR) interface 18 having a set of DCR registers 20 and a second clock oscillator 22. In general, first clock oscillator 12 generates a clock signal having a first frequency (e.g., 27 MHz), while second clock oscillator 22 generates a clock signal having a second frequency (e.g., 54 MHz). The illustrative speeds shown in clock oscillators 12 and 22 correspond to a quantity of "tics" generated by the clock oscillators per second. For example, for every 27 million "tics" of first clock oscillator 12, one second of time is elapsing. Similarly, for every 54 million "tics" of clock oscillator 22, one second is elapsing. Accordingly, the clock signal generated by second clock oscillator 22 is twice as fast (e.g., double the frequency) as the clock signal generated by first clock oscillator 14. As shown, first clock oscillator 12 is external to and drives RTC circuit 14, while second clock oscillator 22 drives DCR interface 18. Unfortunately, as indicated above, the use of multiple clock oscillators can significantly increase the cost of STB 10.

Figure 2:
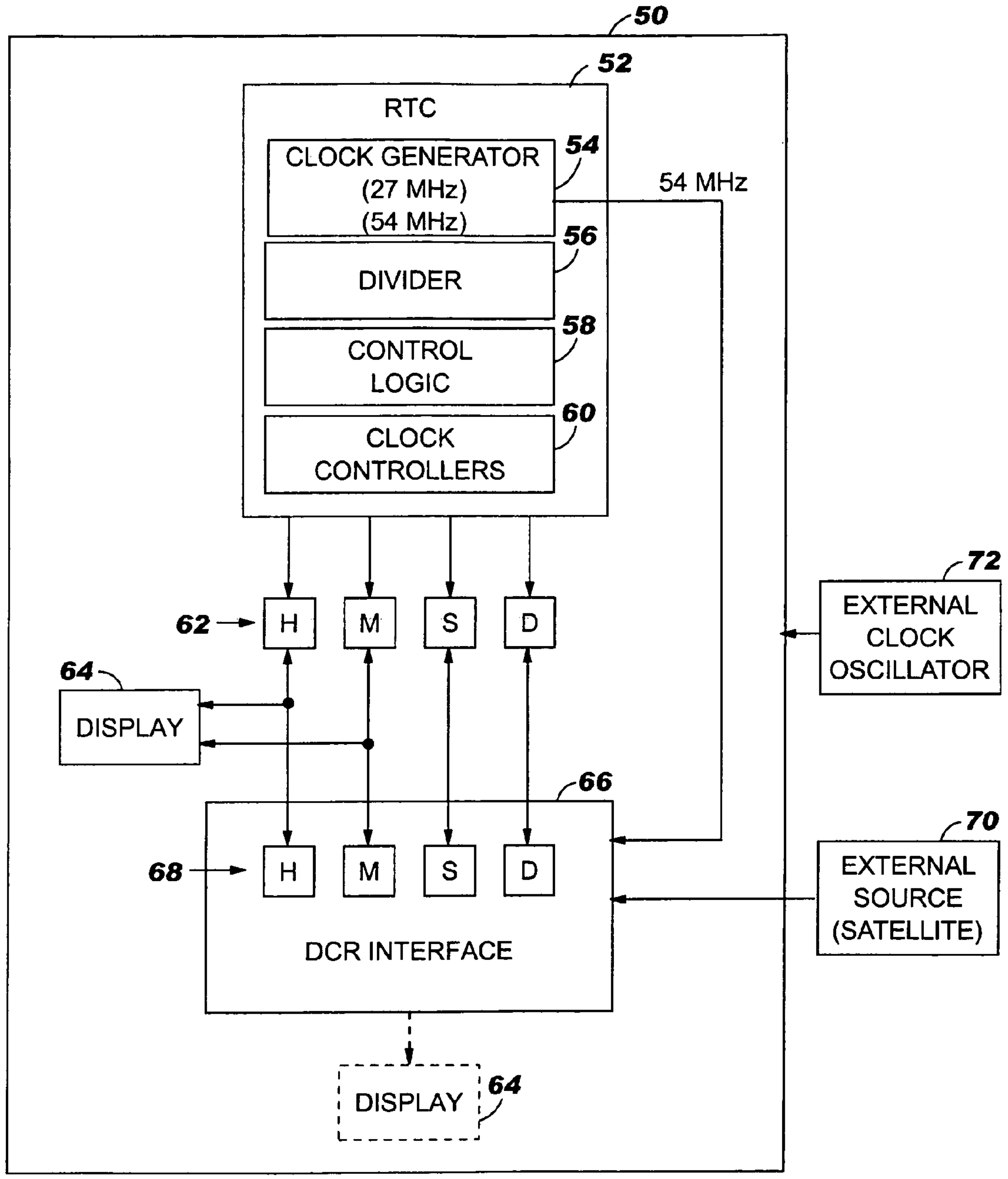
FIG. 2 depicts a set-top box having a single clock generator that is internal to a real time clock circuit and is capable of generating multiple frequencies, according to the present invention.

Referring now to FIG. 2, an STB 50 according to the present invention is shown. In general, the present invention provides an STB that operates with a single, external clock oscillator. This eliminates the cost issues associated with previous devices that were implemented with multiple clock oscillators. As depicted STB 50 includes, RTC circuit 52 having internal clock generator 54, divider 56, control logic 58 and clock controllers 60. STB 50 further includes a set of clock registers 62, DCR interface 66 having a set of DCR registers 68, and display component 64. Under the present invention STB 50 includes a single clock generator 54, which is provided internal to RTC circuit 52 and is capable of generating multiple frequencies. Specifically, internal clock generator 54 receives a signal from external clock oscillator 72, and generates clock signals at multiple frequencies. In general, internal clock generator 54 can generate clock signals of any speeds. However, in a typical embodiment, internal clock generator 54 generates a first clock signal at 27 MHz (e.g., for driving set of clock registers 62), and a second clock signal at 54 MHz (e.g., for driving DCR interface 66).

Under the present invention, internal generator 54 generates a first clock signal (e.g., 27 MHz) that is divided by divider 56 into an initial set of values representing time intervals such as hours, minutes, seconds, and optionally day/date. The initial set of values is communicated from divider 56 to set of clock registers 62. Specifically, the "hours" component of the divided clock signal is communicated to the "H" clock register, the "minutes" component is communicated to the "M" clock register, the "seconds" component is communicated to the "S" clock register, and the "day/date" component (if provided) is communicated to the "D" clock register. As indicated above, internal clock generator 54 also generates a second clock signal (e.g., 54 MHz) that controls DCR Interface 66.

It should be appreciated that although divider 56 is depicted as being internal to RTC circuit 52, this need not be the case. For example, divider 56 could be provided external to RTC circuit 52. In such a case, divider 56 could receive the clock signal directly from RTC circuit 52, and then communicate the initial set of values to their respective clock registers in set 62.

In a first embodiment, display component 64 reads the hour and minute values directly from set of clock registers 62 for display on STB 50. Although not shown, it should be understood that in addition to hour and minute values, seconds and day/date values could also be read and displayed. In any event, in order to maintain the accuracy of this information, an updated set of values can be received by set of DCR registers 68 from an external source 70 such as a satellite or the like. Once received, programming within DCR interface 66 would then communicate the updated set of values from set of DCR registers 68 to set of clock registers 62, where the updated values are read by display component 64. In general, an updated set of values could be provided at any time or according to any schedule to improve clock accuracy. For example, an updated set of values could be provided daily. In any event, in this embodiment, display component 64 receives the initial set of values directly from set of clock registers 62, while the updated set of values is communicated through set of DCR registers 68.

FIG. 2 further shows that in another embodiment of the present invention, display component 64 could read time and date values from set of DCR registers 68 instead of set of clock registers 62. Specifically, as shown in phantom, display component 64 could communicate with DCR interface 66 instead of set of clock registers 62. Similar to the previous embodiment, internal clock generator 54 would generate the 27 MHz clock signal that is divided into an initial set of values representing time and day/date intervals by divider 56 (which may or may not be internal to RTC circuit 52), and then communicated to set of clock registers 62. These values would then be communicated from set of clock registers 62 to set of DCR registers 68. In particular, programming within DCR interface 66 could read the values within set of clock registers 62, and write the same to set of DCR registers 68. Display component 64 would then read the values from set of DCR registers. An updated set of values could be provided from external source 70 to set of DCR registers 68 where they can be directly read by display component.

Figure 3:
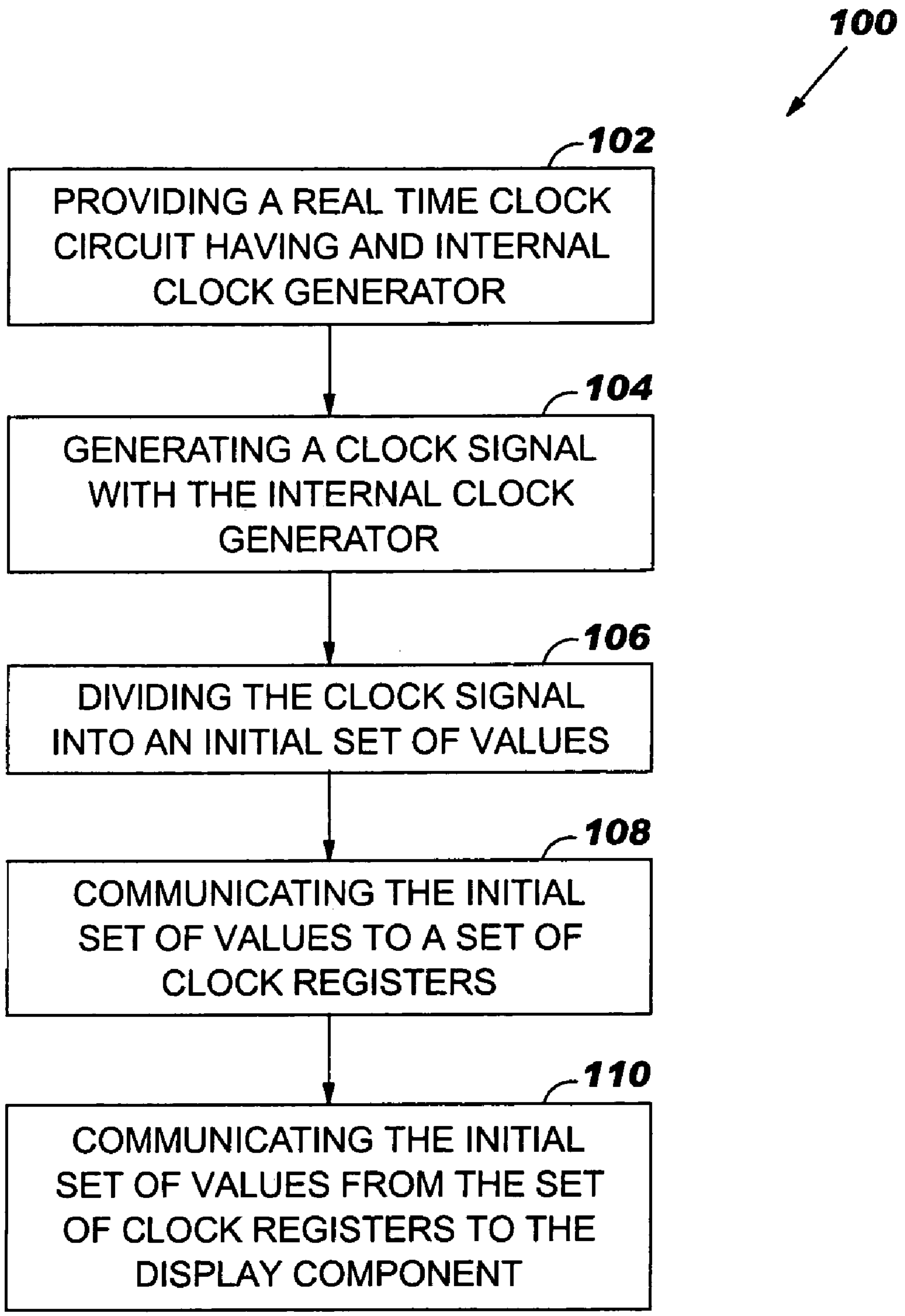
FIG. 3 depicts a method flow diagram according to the present invention.

Referring now to FIG. 3, a method flow diagram 100 according to the present invention is shown. As depicted, first step 102 is to provide a real time clock circuit having an internal clock generator. Second step 104 is to generate a clock signal with the internal clock generator. Third step 106 is to divide the clock signal into an initial set of values. Fourth step 108 is to communicate the initial set of values to a set of clock registers. Fifth step 110 is to communicate the initial set of values from the set of clock registers to the display component. Depending on which of the above-described embodiments is implemented, the communication of the initial set of values and the updated set of values to the display component could be direct, or indirect. To this extent, whenever a set of values is referred to as being communicated to the display component in accordance with the present invention, it is intended to refer to either embodiment.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

We claim:

1. A real time clock circuit comprising an internal clock generator for generating a system clock signal that controls a device through a first signal at a first frequency, wherein the system clock signal is divided by a divider into an initial set of values, and wherein the initial set of values is communicated to a set of clock registers, wherein a single clock generator that is the internal clock generator both controls the device and provides a real time clock input through a second signal at a second frequency different from the first frequency to the set of clock registers, wherein the real time clock circuit is embodied within a set-top box, and wherein the set-top box further comprises:

a dynamic control register (DCR) interface; and a set of DCR registers wherein the initial set of values is communicated from the set of clock registers to the set of DCR registers, wherein the initial set of values is communicated from the set of DCR registers to a display component, wherein the set of DCR registers receive an updated set of values from an external source, and wherein the updated set of values is communicated directly from the set of DCR registers to the display component.

2. The real time clock circuit of claim 1, wherein the initial set of values is communicated directly from the set of clock registers to a display component.

3. The real time clock circuit of claim 1, wherein the external source is a satellite.

4. The real time clock circuit of claim 1, wherein the updated set of values is communicated from the set of DCR registers to the set of clock registers, and wherein the updated set of values is communicated from the set of clock registers to the display component.

5. The real time clock circuit of claim 1, wherein the initial set of values represent time intervals, and wherein the time intervals comprise hours, minutes and seconds.

6. A set-top box, comprising:

a real time clock circuit having an internal clock generator for generating a first signal at a first frequency and a second signal at a second frequency different from the first frequency, the second signal controlling the set-top box;

a divider for dividing the first clock signal into an initial set of values;

a set of clock registers for receiving the initial set of values from the divider;

a display component for receiving the initial set of values from the set of clock registers, a device control register (DCR) interface having a set of DCR registers, wherein the set of DCR registers receive an updated set of values from an external source, wherein the updated set of values is communicated to the display component, wherein the updated set of values is communicated directly to the display component from the set of DCR registers, and wherein a single clock generator that is the internal clock generator both controls the device and provides a real time clock input to the set of clock registers.

7. The set-top box of claim 6, wherein the initial set of values is directly communicated from the set of clock registers to the display component.

8. The set-top box of claim 6, wherein the initial set of values is communicated from the set of clock registers to the set of DCR registers, and wherein the initial set of values is communicated from the set of DCR registers to the display component.

9. The set-top box of claim 6, wherein the external source is a satellite.

10. The set-top box of claim 6, wherein the updated set of values is communicated from the set of DCR registers to the set of clock registers, and wherein the updated set of values is communicated from the set of clock registers to display component.

11. A method for communicating a system clock signal to a display component within a set-top box, comprising:

providing a real time clock circuit having an internal clock generator;

generating a first clock signal at a first frequency and a second signal at a second frequency different from the first frequency with the internal clock generator;

dividing the first clock signal into an initial set of values;

communicating the initial set of values to a set of clock registers;

communicating the initial set of values from the set of clock registers to the display component;

receiving an updated set of values in a set of DCR registers within the set-top box; and communicating the updated set of values to the display component, wherein the step of communicating the updated set of values comprises directly communicating the updated set of values from the set of DCR registers to the display component, wherein a single clock generator that is the internal clock generator both controls the set-top box through the second signal and provides a real time clock input to the set of clock registers.

12. The method of claim 11, wherein the step of communicating the initial set of values from the set of clock registers to the display component comprises directly communicating the initial set of values from the set of clock registers to the display component.

13. The method of claim 11, wherein the step of communicating the initial set of values from the set of clock registers to the display component comprises:

communicating the initial set of values from the set of clock registers to a set of DCR registers; and communicating the initial set of values from the set of DCR registers to the display component.

14. The method of claim 11, wherein the step of communicating the updated set of values comprises:

communicating the updated set of values from the set of DCR registers to the set of clock registers; and communicating the updated set of values from the set of clock registers to the display component.

* * * * *

UNITED STATES PATENT AND TRADEMARK OFFICE

CERTIFICATE OF CORRECTION

PATENT NO. : 7,661,008 B2
APPLICATION NO. : 11/196111
DATED : February 9, 2010
INVENTOR(S) : Retter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Thirtieth Day of November, 2010

David J. Kappos

*Director of the United States Patent and Trademark Office*